United States Patent [19]
Hartman

[11] 3,749,179
[45] July 31, 1973

[54] GARDEN CULTIVATOR

[76] Inventor: Arlie Hartman, Box 47, Mentone, Ind. 46539

[22] Filed: Mar. 4, 1971

[21] Appl. No.: 120,915

[52] U.S. Cl.................. 172/297, 172/482, 172/739
[51] Int. Cl............................................. A01b 63/24
[58] Field of Search.................. 172/273, 297, 305, 172/307, 329, 333, 340, 348, 361, 482, 739

[56] References Cited
UNITED STATES PATENTS

| | | | |
|---|---|---|---|
| 2,223,993 | 12/1940 | Jessup................................. | 172/297 |
| 672,111 | 4/1901 | Vanschoiack...................... | 172/348 |
| 2,560,631 | 7/1951 | Burgess............................... | 172/307 |
| 2,177,026 | 10/1939 | Nightenhelser et al............. | 172/297 |
| 2,239,332 | 4/1941 | Mee..................................... | 172/273 |
| 2,682,820 | 7/1954 | Ludema.............................. | 172/307 |
| 667,596 | 2/1901 | Stark................................... | 172/340 |

Primary Examiner—Robert E. Pulfrey
Assistant Examiner—Eugene H. Eickholt
Attorney—Paul H. Gallagher

[57] ABSTRACT

A cultivator particularly adapted for use in a garden or acreage, mountable on a tractor, the cultivator extending from one side of the tractor and ahead of and under direct observation of the operator, and including means manually manipuable by the operator for controlling the cultivator in its engagement with the ground. The device is mountable merely by sliding a shaft laterally into a pair of eye bolts, and it is held in place by friction.

2 Claims, 4 Drawing Figures

Patented July 31, 1973
3,749,179
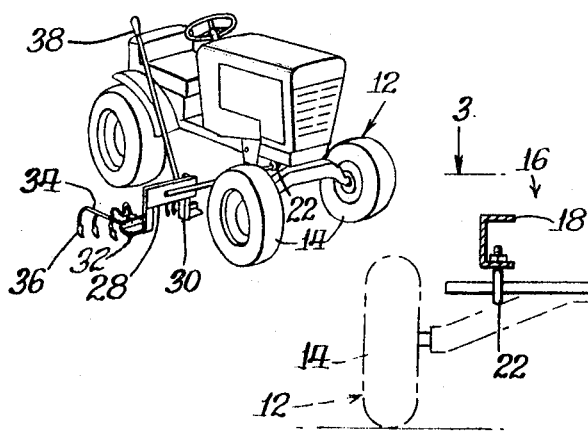
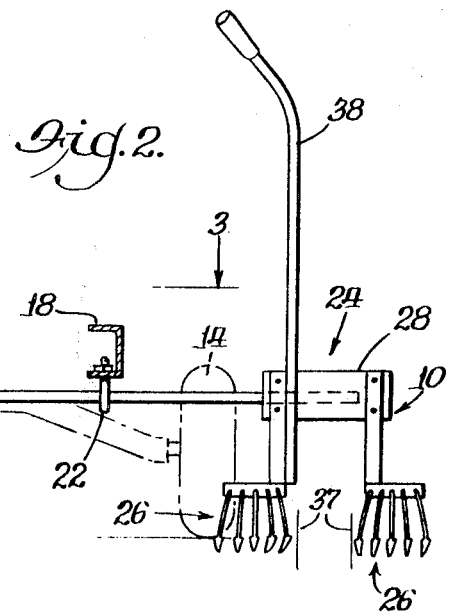
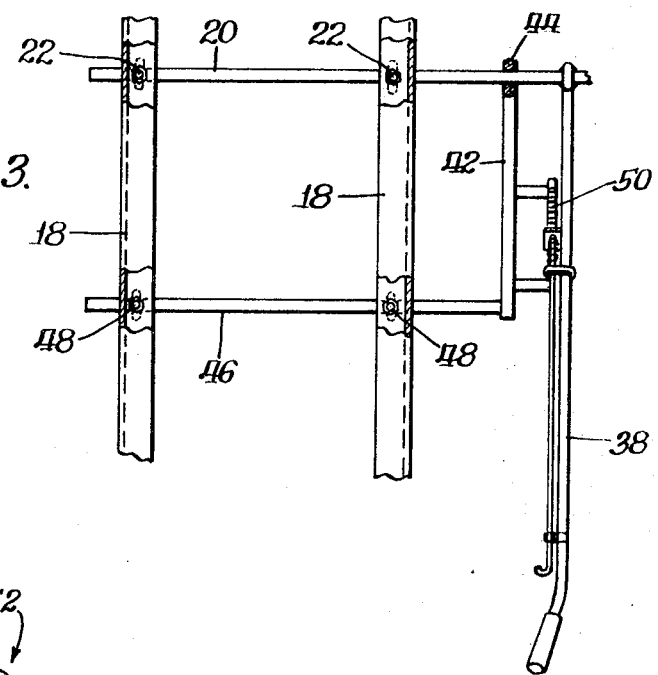
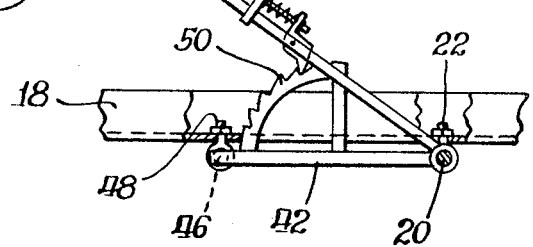
Inventor:
Arlie Hartman
By Carl H. Gallagher
Atty.

GARDEN CULTIVATOR

OBJECTS OF THE INVENTION

A broad object of the invetion is to provide a cultivator mountable on a tractor and of small size such as is adaptable to use in a garden or acreage, having novel construction and arrangement whereby the operative part of the cultivator that engages the ground is under direct observation and under immediate control of the operator.

Another object is to provide a cultivator of the character referred to above, including means for mounting it on a tractor so as to extend laterally to one side and be under the direct observation of the operator.

Still another object is to provide a cultivator and mounting of the character just referred to wherein the operative part of the cultivator engaging the ground can be easily and quickly manipulated according to the oncoming conditions of the ground ahead of the cultivator.

A further object is to provide a cultivator of the foregoing character that is operatively mountable by merely inserting a shaft laterally into a pair of eye bolts, and it is held therein only by friction, and is so held in an unusually stable position, preventing sidewise shifting.

A still further object is to provide a cultivator of the kind just immediately referred to, and an attachment for use in releasably holding the cultivator in adjusted position, wherein the attachment is as simply mounted as is the cultivator itself.

DESCRIPTION OF A PREFERRED EMBODIMENT

In the drawings:

FIG. 1 is a perspective view showing the cultivator of the invention mounted on a tractor, the tractor being in semi-schematic form;

FIG. 2 is a transvers vertical sectional view taken from behind the cultivator and looking forward showing the cultivator and indicating only small portions of the tractor;

FIG. 3 is a view oriented according to line 3—3 of FIG. 2, showing a portion of the cultivator and an attachment thereto; and FIG. 4 is a view taken from the right of FIG. 3.

Referring in detail to the accompanying drawings the cultivator of the invention is indicated in its entirety at 10, mounted on a tractor 12. The tractor may be of known type such as a small garden type tractor, which includes front wheels 14. The tractor also includes a frame 16 having bottom elements 18 which may be of suitable kind such as channels (FIG. 2), the front ends of which reach to and are supported by the front axle having the front wheels mounted thereon.

The cultivator 10 includes a transverse beam 20 which may be in the form of a shaft or round rod and which extends under the frame of the tractor and is mounted thereon. That mounting means is extremely simple and preferably includes eye bolts 22 having bolt elements secured in the channels. The cultivator is simply put in place by inserting the shaft 20 through the eyes of the eye bolts, and it is held in place by friction, without further securement.

The beam 20 extends laterally to one side of the tractor proper, for example to the right, and on its laterally extended end is mounted a cultivator component 24 which in this case incudes a pair of cultivator units 26.

This cultivator component 24 is preferably fixed on the beam and is arranged for vertical swinging movements as described below, and in those movements the beam is rocked in the eye bolts.

The cultivator component 24 includes a transverse plate 28 secured to the beam as by welding, and it may extend laterally beyond the end of the beam. The cultivator units 26, spaced along the length of the beam, are identical in construction and each includes a mounting element 30 secured to the plate 28 as by bolting or otherwise, and extending downwardly where at its lower end is secured a plate element 32 extending generally rearwardly, and secured to this plate element is a cultivator proper, of known kind, including a plurality of fingers 34 each having a shovel 36 thereof. If desired hiller plates 37 of known kind may be provided, inwardly of the cultivator units, and between which the hills pass.

Secured to the cultivator component 24 as on the plate 28 is a handle or operating lever 38 extending upwardly and rearwardly toward the seat of the tractor, this lever having a hand grip 39 on its upper end.

The handle 38 is rigidly secured to the cultivator component 24, and upon swinging it in vertical directions, the cultivator component is correspondingly raised and lowered, out of the ground or into the ground.

The cultivator is mounted on the tractor in a very simple manner, as indicated above, by merely inserting the beam 20 through the transversely spaced eye bolts 22. There is no need for collars or set screws etc., for securing the cultivator in place, but it is held in place merely by friction with the beam working against the eye bolts in opposite directions. The friction holding the beam 20 in the eye bolts is sufficient for preventing sidewise shifting, but it enables adjusting of the cultivator transversely, to position it farther out or farther in, relative to the tractor. The cultivator component being disposed laterally to one side of the tractor body, is positioned nearly directly ahead of the operator and clearly within his observation. The operator can observe the oncoming ground conditions and by manipulating the handle 38, and can raise or lower the cultivator units according to the desired cultivating operation, or ground conditions, or to for example lift the cultivator units entirely out of the ground in the event of encountering obstacles such as rocks, etc. The handle 38 provides an easy and immediate means for controlling the cultivator component according to the ground conditions. The easy and quick manipulation of the cultivator component enables the operator to lift the cultivator units out of the ground to "jump over" hills or plants as desired.

While the arrangement above described serves the purpose in most instances, it may at times be desired to releasably secure the opreating handle 38 in an adjusted position, and for this purpose an attachment shown in FIGS. 3 and 4 may be utilized. FIG. 3 shows the cultivator beam 20, the tractor frame elements 18, and the eye bolts 22 in which the beam is mounted. The attachment referred to is indicated in its entirety at 40 and includes a rearwardly extending bar 42 having an eyelet 44 at its forward end loosely and rockably receiving the beam 20. Secured to the rear end of the rod 42 is another beam or rod 46 extending transversely and insertable through additional eye bolts 48 also secured in the channels 18.

FIG. 4 shows a releasable latching means of known kind for latching the handle 38 in adjusted position which includes an arcuate ratchet element 50 secured to the bar 42 and a latching means 52 mounted on the handle 38. While the operator may wish to manually manipulate the handle throughout the cultivating operation, it may be desired at times such as on level and uniform ground, to adjust the handle at a certain position and not remove it thererom and the means shown in FIG. 4 enables this step in the operation.

Preferably the attachment 40 can be removed from the cultivator per se by simply removing the beam 20 from the eye bolt 44, and it is easily put in place by inserting the beam into that eye bolt and then inserting both beams 20 and 46 simultaneously into the respective eye bolts which as will be observed is an extremely simple operation. The beam 46 being inserted in the eye bolts 48 secures that beam in stationary position, while in adjustments of the handle 38, the beam 20 is enabled to rock in its corresponding eye bolts.

The construction is extremely simple and inexpensive, both as to the cost of the parts involved and in the manufacture thereof. In addition to the advantage of the cultivator being ahead of the operator, as set out above, the cultivator component does not in any way interfere with any other attachments which may be applied to the tractor, whether to the front or to the rear, it being of course possible to draw an implement with the cultivator attached.

It will be appreciated that the device has great practicability in connection with small plots or acreages wherein a standard cultivator, whether mounted ahead or to the rear, is not practical because of the relatively great areas needed in turning at the ends of the field, while in the present case the tractor can proceed close to the ends of the plot and cultivate to a position within inches of the intended boundary, such as a fence. Stil another advantage is that the device may be used on side hills where because of the tendency to shift down hill, it may be desired to adjust the cultivator laterally upwardly, or downwardly, and also in connection with the side hill it may be necessary to lift the cultivator more often to avoid plants, and this device adapts itself readily to such operation.

I claim:

1. A cultivator construction for use in conjunction with a tractor having a frame, wheels, and an operator's seat at the rear, comprising,
    mounting means,
        the mounting means including transversely spaced eyebolts secured to the tractor frame,
    a transverse beam extending slidingly through the eyebolts, and the beam extending laterally therefrom in one direction beyond the wheels,
    a cultivator component mounted on the laterally extended end of the beam, and the beam as well as the cultivator component being held in position in the eyebolts solely by the friction between the beam and the eyebolts, the cultivator component including cultivator units engageable with the ground beyond the wheels, the cultivator components being swingable about the axis of the beam in vertical movements,
    means for releasably holding the cultivator component in adjusted position which comprises a longitudinally extending arm rockably receiving the beam on the cultivator component, and itself having a lateral beam fitted in transversely spaced eyebolts in the tractor frame and held therein solely by friction,
    means on said arm and the handle cooperating for releasably holding the handle in adjusted angular positions, and
    a manually operable handle secured to the cultivator component and extending into a position adjacent the operator's seat for manipulation by the operator and so manipuable in vertical swinging movements for correspondingly raising and lowering the cultivator component.

2. A cultivator construction according to claim 1 wherein the cultivator component includes a laterally extending plate rigidly secured to the beam at the outer extended end of the beam,
    the cultivator units are spaced apart along the direction of the beam, and the direction transverse to the tractor and each includes a downwardly extending leg secured to the plate and a rearwardly extending foot secured to the lower end of the leg,
    each cultivator unit includes a plurality of fingers secured to the foot, and the fingers have shovels engageable with the ground and
    said manual arm is rigidly secured to one of said legs.

* * * * *